United States Patent [19]

Kraus et al.

[11] Patent Number: 4,759,503
[45] Date of Patent: Jul. 26, 1988

[54] DEVICE FOR MAKING ARTIFICIAL SNOW

[76] Inventors: Edmund J. Kraus; Robert A. Kraus, both of 1636-T E. Edinger, Santa Ana, Calif. 92705

[21] Appl. No.: 74,040

[22] Filed: Jul. 16, 1987

[51] Int. Cl.$^4$ .................. A01G 15/00; B05B 1/28; B05B 7/06; F16M 11/12
[52] U.S. Cl. ................... 239/14.2; 239/280.5; 239/430; 248/81; 248/183
[58] Field of Search .............. 239/14.2, 280.5, 289, 239/430, 472; 248/80, 81, 183, 278

[56] References Cited

U.S. PATENT DOCUMENTS

| | | | |
|---|---|---|---|
| 936,769 | 10/1909 | Flower | 248/183 |
| 1,631,874 | 6/1927 | Lasher et al. | 248/81 |
| 2,464,366 | 3/1949 | Bakke | 248/80 |
| 3,494,559 | 2/1970 | Skinner | 239/14.2 X |
| 3,829,013 | 8/1974 | Ratnik | 239/14.2 |

*Primary Examiner*—Andres Kashnikow
*Assistant Examiner*—Patrick N. Burkhart

[57] ABSTRACT

Compressed air and water are mixed, and are accelerated to a jet of high velocity within a cylindrical, non obstructive device; the explosive decompression of compressed air to atmospheric pressure within a diverging exit nozzle disintegrates the jet of water into a jet of tiny droplets which freeze in contact with colder atmospheric air to ice crystals of snow.

9 Claims, 1 Drawing Sheet

DEVICE FOR MAKING ARTIFICIAL SNOW

FIELD OF THE INVENTION

This invention relates to a snow making devices in which the mixing of compressed air and water within a non obstructive, cylindrical cavity causes the water to accelerate into a jet of high velocity, and to atomize within a diverging exit nozzle into tiny droplets which subsequent to discharge into colder atmospheric air freeze into ice crystals of snow.

BACKGROUND OF THE INVENTION

Due to limited snow falls, and the ever increasing demand for longer skiing seasons, the making of artificial snow has become a necessary function in the operating a ski resort. Nature however, does not always provide favorable conditions for the making of artificial snow, especially at the begin, and at the end of a skiing season. The making of artificial snow is therefore subject to certain inherent limitation, such as e.g., the atmospheric temperature, which ideally, should be in the range of 18° F. to 22° F., and a humidity, which ideally should be less than 45% relative. Typically, at the begin, and at the end of a skiing season, the expected atmospheric temperature may be in the range of 28° F. to 32° F., while the relative humidity may fluctuate between 50% to 65%. At such relative high atmospheric temperatures, compounded by relative high temperature of the needed water and compressed air supply which may be in the range of 40° F. to 45° F., most snow making equipment of the prior art may perform unsatisfactory, resulting in a snow not suitable for skiing, nor being cost effective for the operator of a ski resort.

PRIOR ART

Basically, the prior art comprises an elongated chamber which at one end is provided with an air and water inlet port, and with a flow restrictive, (convergent) exit nozzle at the other end. The injection of compressed air into a steady stream of water causes mixing of the air and water in the chamber. The flow restriction through the nozzle keeps the air at constant pressure during transit through the chamber. Thus, no expansion of compressed air, and hence no pre-cooling of the water may take place within the chamber. Abrupt expansion of the compressed air to atmospheric pressure at the nozzle end causes atomizing (disintegration) of the stream of water into a jet of tiny droplets which are projected outward to freeze in contact with colder atmospheric air into ice crystals of snow. The prior art is however subject to certain inherent limitations arising from the use of convergent exit nozzles. Such as e.g., the tendency to slobber non atomized water from the nozzle end at close proximity to ground; the production of a large amount of fine water droplets tending to evaporate before falling to the ground, hence not being available for conversion into snow; the generation of high level noise caused by the explosive decompression of the compressed air to atmospheric pressure at the nozzle end; and excessive wear of the constrictive nozzle portion due to oppressive materials being suspended in the water.

OBJECTS OF THE PRESENT INVENTION

It is therefore an object of the present invention to overcome the limitations of the prior art.

Another object of the present invention is to provide the means for mixing water and compressed air; to provide the means for accelerating the water into a jet of high velocity; to provide the means for pre-cooling the jet of water; and to provide the means for disintegrating the jet of water into a jet of tiny droplets while in transit through the system; as well as to provide the means for projecting the jet of tiny droplets along a predetermined trajectory.

Yet another object of the present invention is to provide the means for the alternate compression and expansion of an amount of trapped air within a chamber so as to produce a pulsating jet of high velocity water droplets.

Yet a still other object of the present invention is to provide a unique vertical and horizontal adjustment, for purpose of changing the direction of the projected jet of water droplets.

The features which are believed to be characteristic of the present invention, both as to their organization and method of operation, together with further objects and advantages will be better understood from the following description in combination with the accompanying drawing which we have chosen for purpose of explaining the basic concept of the invention, it is to clearly understood however, that the invention is capable of being implemented into other forms and embodiments within the scope of the present invention by those skilled in the art; such other forms and embodiments as e.g., a multiple barrel configuration of the single barrel device described herein, as well as a different port arrangement and modified vertical and horizontal adjustment will be taken advantage of.

BRIEF DESCRIPTION OF THE DRAWING

For reason of simplicity, like parts at FIGS. 1, 2, and 3 have been given like reference numbers.

DESCRIPTION OF THE PRESENT INVENTION

Figure 1:
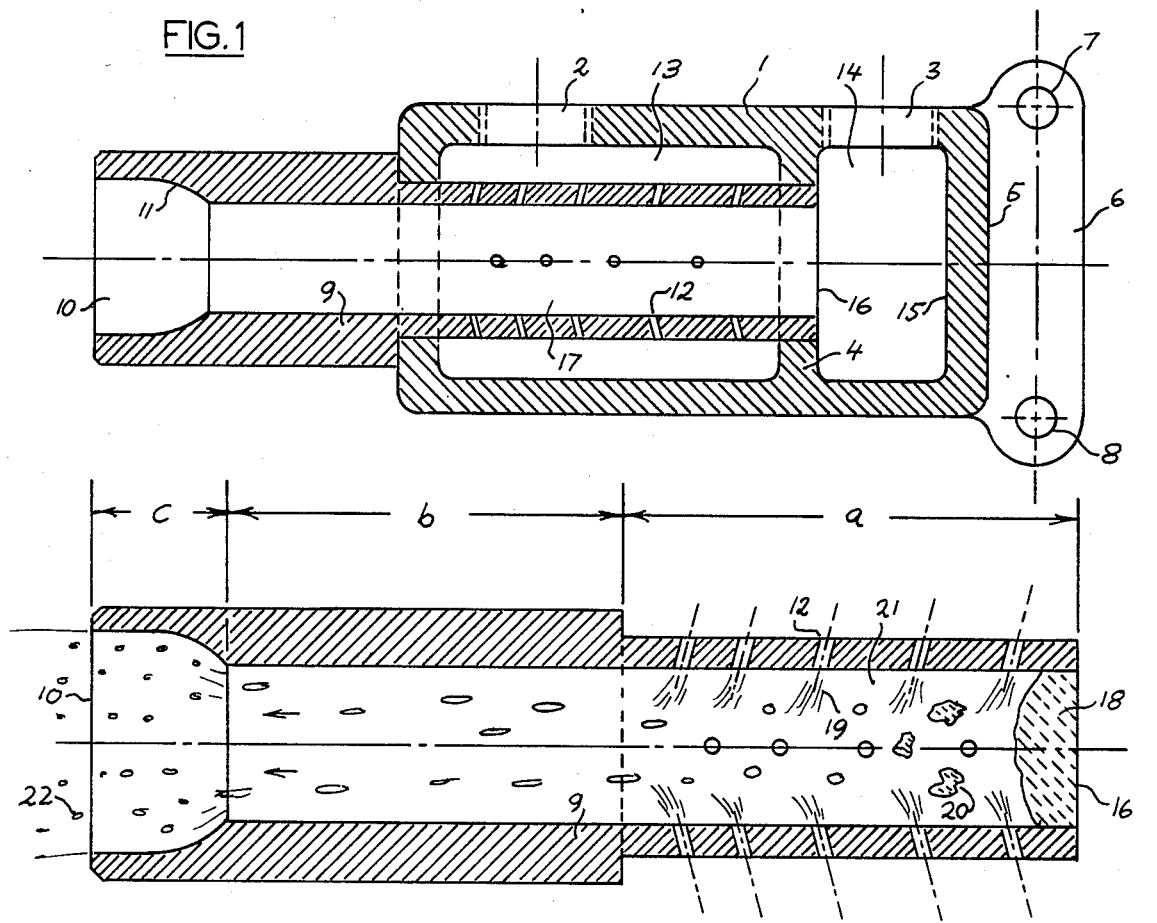
FIG. 1 represents the sectional side view of the invention in the single barrel arrangement, showing the air and water inlet ports, as well as showing the internally disposed fluid passages, and air injection nozzles.

Referring now to drawing FIG. 1 showing the present invention in the preferred embodiment, comprising the housing 1 having the air inlet port 2, the water inlet port 3, the internal partition 4, and the identical first pair of parallel at given distance from each other at the housing rear end 5 horizontally disposed hinge brackets 6 having the upper pivot aperture 7 and the lower pivot aperture 8. The device further comprises the tubular member 9 of cylindrical, non obstructive configuration having the bell shaped, diverging type exit nozzle 10 of specific internal shape configuration 11; as well as having a multitude of longitudinally, and circumferentially spaced, through the tubular member 9 inward, and slightly forward directed fluid communicative air injection nozzles 12, the combined cross-sectional area of which being restricted to pass no more than a predetermined maximum amount of air at operating pressure, and being arranged so that their longitudinal spacing becomes progressively less toward exit nozzle 10, and so that each row of circumferentially spaced nozzles 12 being staggered relative to its adjacently located row. The tubular member 9 is inserted, and is fixed into housing 1, so that partition 4 forms the annular chamber 13 surrounding the portion of the tubular member comprising the air injection nozzles 12; and so as to form the therefrom separated end chamber 14 located between the housing inner end 15 and the longitudinal inlet 16 of tubular member 9. The arrangement permits a steady stream of water to pass via inlet port 3 and end chamber 14 into/and through tubular member 9; as well as it permits compressed air to pass via inlet port 2, the annular chamber 13 and the air injection nozzles 12 into the interior 17 of the tubular member to be mixed with the water.

Figure 2:
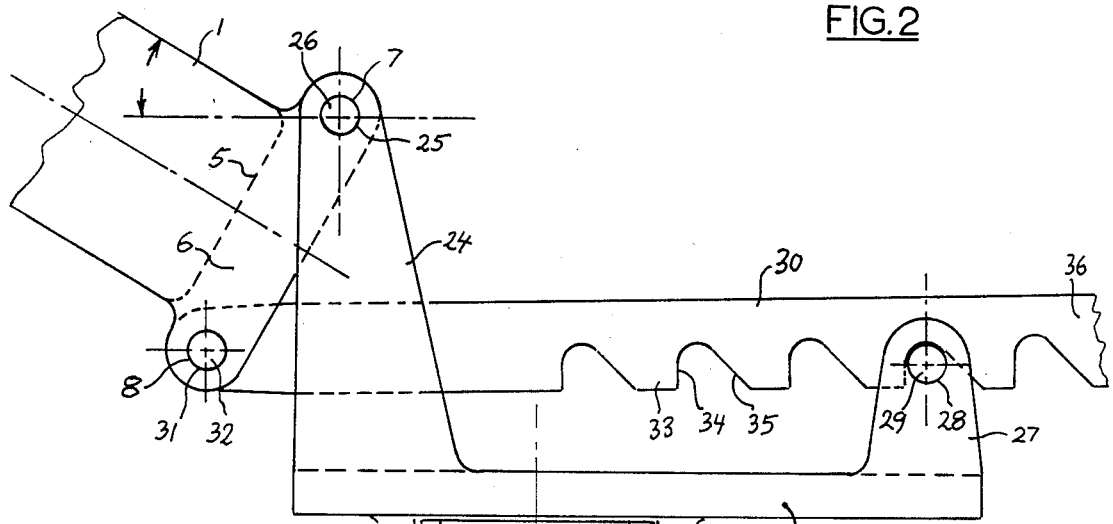
FIG. 2 represents the process of expanding air within a stream of water, so as to cause linear expansion of the water while transferring heat within the system from the water to expanding air.

Referring now to drawing FIG. 2 depicting the method of producing snow by means of mixing air and water within a tubular member of cylindrical, non obstructive inside configuration. As may be seen, the tubular member 9 is hypothetically divided into three distinct sections. Section (a), at which the compressed air is injected into/and is mixed with a steady stream of water. Section (b), at which the partial expansion of the compressed air causes the mixture of air and water to be accelerated into a jet of high velocity, thereby causing a reactive force in opposite direction; and in which the water is pre-cooled by the cooling effect generated by the expansion of the compressed air. Section (c), at which the explosive decompression of the still partially compressed air to atmospheric pressure causes the disintegration of the water into a jet of tiny droplets of approximately equal size. Accordingly, the method of producing snow by means of the above described device comprises the induction of a steady stream of water 18 at a given pressure via port 3, end chamber 14, and the longitudinal opening 16 into tubular member 9; and comprises the induction of compressed air at approximately equal pressure via inlet port 2, annular chamber 13, and injection nozzles 12 into the stream of induced water 18. The induction of compressed air through injection nozzles 12 forms a multitude of high velocity jets 19 which cause a violent agitation and division of the water into smaller portions 20 surrounded by compressed air 21. The compressed air tents to partially expand within the water, and thereby accelerate the mixture of air and water into a jet of high velocity whereby the reactive force of accelerating mass counteracts the static pressure of supplied water. As the jet of air and water enters exit nozzle 10, the explosive decompression of the still partially compressed air to atmospheric pressure causes the disintegration of the water into a jet of tiny droplets of approximately equal size 22. Unlike the devices of the prior art, the present invention makes use of the cooling effect generated by the partial expansion of the compressed air within the non obstructive section (b), and during full expansion of the still partially compressed air to atmospheric pressure within the diverging exit nozzle 10 at section (c) of tubular member 9. The compressed air therefore tents to absorb an amount of sensible heat, and thereby tents to pre-cool the water during transit through sections (b) and (c) of tubular member 9. Subsequent to leaving exit nozzle 10, the water droplets 22 in contact with colder atmospheric air at low humidity released, and thereby transfers an amount of latent heat of of evaporation to the atmosphere, which further cools the water droplets to the nucleating temperature of about 32° F., at which point further transfer of latent heat of solidification from the water to the colder atmospheric air causes the water droplets to freeze into ice crystals of snow. As a consequence of reactive forces generated by the gaining of momentum by the water within tubular member 9 and a small amount of air being trapped within end chamber 14, the present invention is characterized by a slight pulsating discharge of the water droplets from the exit nozzle 10. This slight pulsating action is the consequence of reactive forces tending to alternately compress and to expand the small amount of trapped air within end chamber 14. Whereby the slight pulsating discharge of projected water droplets 22 is of particular advantage, in that its provides a greater exposure of the projected jet of water droplets to their surrounding atmospheric air, and thereby promoting a faster heat exchange between the droplets and the colder atmosphere. Moreover, the unique internal shape configuration of exit nozzle 11, which conforms to the natural shape of a radially and longitudinally expanding jet of air and water from a square edge orifice, causes a significant reduction in the noise level generated by the spontaneous full expansion of the partially compressed air to atmospheric pressure; as well as it prevents the slobbering of non atomized water in close proximity to ground.

Figure 3:
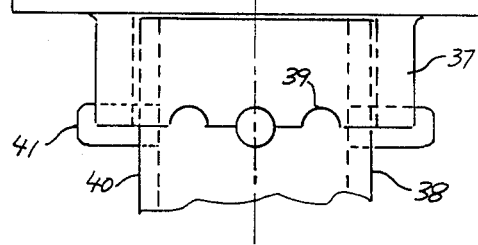
FIG. 3 represents the vertical and horizontal adjustment for the jet of projected water droplets.

For purpose of gaining more time to freeze the projected water droplets along their trajectory into ice crystals of snow before falling to the ground, or in some cases, where it is desirable to achieve a more evenly distributed fallout of snow, it necessary to make certain elevation and/or azimuth adjustment of the projected jet of water droplets. FIG. 3 shows the arrangement of components to accomplish a vertical and/or horizontal adjustment of the projected jet of water droplets. As may be seen in FIG. 3, end 5 of housing 1 comprises the first pair of parallel, upward extending hinge brackets 6 having the upper pivot aperture 7 and the lower pivot aperture 8; and shows the base plate 23 comprising a second pair of parallel arranged, upward extending hinge brackets 24 having the pivot apertures 25. The first pair of hinge brackets are placed between the second pair of hinge brackets so as to align their upper pivot apertures 7 with the pivot apertures 25 of the second pair of hinge brackets in a manner suitable to receive the upper hinge pin 26, which provides vertically directed, angular movement between the housing and the base plate. The base plate further comprises at a location opposite to the second pair of hinge brackets, a pair of parallel disposed, upward extending brackets 27 having the apertures 28, being provided with the ratchet pal pin 29. The device further comprises the ratchet bar 30 having at one end the aperture 31, which via lower hinge pin 32 and aperture 8 of hinge bracket 6 provides angular movement between the housing and the bar. The ratchet bar further comprises a series of longitudinally spaced ratchet teeth 33 extending from its lower side downward. Each tooth having a first surface 34 disposed perpendicular to its longitudinal center, and a second surface 35 disposed at a specific angle relative to the longitudinal center of the bar. Thus, when the housing is lifted to a given horizontal position, the present ratchet tooth in engagement with pal pin 29 will slide over the pal pin until the next pair of ratchet drops over the pal pin to hold the housing in its newly assumed position. To lower the housing vertical position merely requires to lifting of bar end 36, which disengages the ratchet tooth in engagement with the pal pin. The base plate further comprises the tubular member 37 extending centrally located at a given length from base plate downward so as to fit, and slide over the support post 38. At its lower end, the tubular member is provided with a series of circumferentially spaced, longitudinal serrations 39 being dispose, so as to engage the laterally from the outer surface 40 of support post 38 outward extending pegs 41. Thereby fixing the base plate subsequent to rotation relative to support post 38 at a desired azimuth position.

What is claimed is:

1. A device for making artificial snow comprising:
 a housing means having means for separating said housing into a first and second chamber; port means for admitting water into said first chamber; and port means for admitting compressed air into said second camber; said housing means having a first aperture, and said means for separating said first and second chamber having a second aperture, said first and second apertures being disposed in line of common center;
 a tubular member having a cylindrical inner surface; a first portion of substantially reduced outside diameter provided with a series of small, longitudinally and circumferentially spaced, laterally at a specific angle through said tubular member inward and forward directed orifices; and a second portion of substantially increased outside diameter provided with a diverging exit nozzle of specific internal shape configuration; said first portion of said tubular member being inserted through said first and said second aperture, and being fixed therein, so that said first chamber forms a fluid communicative space between said first port for admitting water and the longitudinal inlet of said tubular member; and said second chamber forms a fluid communicative space surrounding said first portion of said tubular member between said second part for admitting compressed air and said series of small orifices;
 a pair of suitable hinge support members protruding vertically oriented from the rear end of said housing outward; said hinge support members having upper and lower apertures provided with an upper and lower hinge pins;
 a support means comprising a first pair of upward extending hinge support members, each having a upper aperture being in pivoting engagement with said upper hinge pin so as to provide vertically directed, angular movement between said housing and said support means; a second pair of upward extending members provided with a ratchet pin, said second pair of members being located opposite to said first pair of upward extending members;
 an elongated member comprising at its lower side a multitude of equally spaced teeth, a first surface of said teeth being disposed perpendicular, and second surface of said teeth being disposed at a specific angle relative, to the longitudinal center of said elongated member; said elongated member further comprises at one end an aperture being pivotally engaged with said lower hinge pin, while said first surface of one of said teeth may be engaged with said ratchet pin, thereby holding said housing at a desired angular position relative to said support means;
 a length of tubular member extending centrally from said support means downward, and being in rotatable engagement with the upper end of a vertically oriented pole; said tubular member having at its lower end a series of circumferentially spaced, longitudinal serrations, which by rotating said support means may be engaged with a pair of laterally from said support pole extending pegs, thereby holding said support means in its desired Azimuth position.

2. A device as resided in claim 1, in which said series of small orifices are directed inward and forward at an angle of less than 90 relative to said longitudinal center tubular member; and in which each row of said circumferentially spaced orifices is staggered relative to its adjacently located row; and in which the longitudinal distance between each row of circumferentially spaced holes progressively increases in direction with the flowing fluid.

3. A device as resided in claim 1, in which said housing and said means for separating said first and second chamber comprises multiple pairs of said first and second apertures, each pair being aligned so as to receive one of said tubular members.

4. A device as resided in claim 3, wherein said tubular members being aligned side by side, and at a specific angle of no more than 15° relative to one another.

5. A device as resided in claim 1, in which the internal shape of said diverging exit nozzle conforms to the natural shape of an radially and longitudinally expanding jet of air and water being projected through a sharp edged orifice.

6. A device for making artificial snow comprising:
 a housing means having means for partitioning said housing into a first and second chamber; first port means for admitting water into said first chamber, and second port means for admitting compressed air into said second chamber; and means for supporting said housing rear end having upper and lower apertures provided with an upper and an lower hinge pin;
 a multitude of tubular members, each having a cylindrical inner surface, a first portion of substantially reduced outside diameter, and a second portion of substantial greater than said reduced diameter; said first portions having a multitude of longitudinally and circumferentially spaced orifices extending from the outer to said inner surface radially at a well defined angle inward; and said second portion having a diverging exit nozzle of specific internal shape configuration; said first portion of said tubular members being inserted side by side through said housing and into said means for partitioning said housing in a manner so as to form a fluid communicative passage from said first port means via said first chamber into the longitudinal inlet of said tubular members; and so as to form a fluid communicative passage from said second port means via said second chamber surrounding said first portion of said tubular members and via said longitudinally spaced orifices into said interior of said tubular members;
 a means for supporting, and for two axis adjustment of, said housing relative to ground comprising: a base plate, a first pair of members protruding upwardly from a first side of said baseplate, and having upwardly located apertures in pivotal engagement with said upper hinge pin; a second pair of members protruding upwardly from an opposite second side of said baseplate, and provided with a pal pin; an elongated member having at one end an aperture in pivotally engagement with said lower hinge pin, and having a series of equally spaced teeth disposed along its lower side, so that each tooth may be engaged with said pal pin to hold said housing at a desired vertical position relative to ground; a tubular member extending centrally from said support means downward so as to be in rotative engagement with a vertically extending support pole, said downward extending tubular member having at the lower end a series of circumferentially spaced serrations which by rotating said tubular member may be engaged with a pair of opposite from said pole laterally outward protruding pegs to hold said housing at a desired azimuth position.

7. A claim as resided in claim 6, wherein the longitudinal center of said side by side within said housing disposed tubular members are arranged at a given angle from one another.

8. A claim as resided in claim 6, wherein the inner surface configuration of said diverging exit nozzle conforms to the longitudinal and radial shape of a jet of air and water expanding from a sharp edge nozzle.

9. A claim as resided in claim 6, wherein an amount of air may be trapped within said first chamber so as to generate a resonance by the alternate compression and expansion of said amount of trapped air, thereby producing a slight pulsating jet of projected water droplets.

* * * * *